(12) United States Patent
Li et al.

(10) Patent No.: US 11,313,737 B2
(45) Date of Patent: Apr. 26, 2022

(54) OPTICAL FIBER GRATING SENSING METHOD APPLIED TO SMALL-SIZE FIRE SOURCE MONITORING

(71) Applicants: Zhengying Li, Wuhan (CN); Lixin Wang, Wuhan (CN); Honghai Wang, Wuhan (CN); Huiyong Guo, Wuhan (CN); Desheng Jiang, Wuhan (CN); Jiaqi Wang, Wuhan (CN)

(72) Inventors: Zhengying Li, Wuhan (CN); Lixin Wang, Wuhan (CN); Honghai Wang, Wuhan (CN); Huiyong Guo, Wuhan (CN); Desheng Jiang, Wuhan (CN); Jiaqi Wang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 17/387,995

(22) Filed: Jul. 28, 2021

(65) Prior Publication Data
US 2022/0042860 A1    Feb. 10, 2022

Related U.S. Application Data

(63) Continuation of application No. PCT/CN2021/099390, filed on Jun. 10, 2021.

(30) Foreign Application Priority Data

May 9, 2020    (CN) .......................... 202010387542.4

(51) Int. Cl.
*G01K 11/3206* (2021.01)
*G02B 6/02* (2006.01)
(Continued)

(52) U.S. Cl.
CPC .... *G01K 11/3206* (2013.01); *G01K 2003/145* (2013.01); *G02B 6/02076* (2013.01); *G08B 29/043* (2013.01)

(58) Field of Classification Search
CPC ......... G01K 11/3206; G01K 2003/145; G02B 6/02076; G08B 29/043
See application file for complete search history.

(56) References Cited

U.S. PATENT DOCUMENTS

| 6,876,786 B2 * | 4/2005 | Chliaguine ........ G01D 5/35303 250/227.11 |
| 10,712,212 B2 * | 7/2020 | Liu ........................ B64D 45/00 |

(Continued)

FOREIGN PATENT DOCUMENTS

| CN | 108548548 A | 9/2018 |
| GN | 103674086 A | 3/2014 |

(Continued)

*Primary Examiner* — Nathaniel T Woodward
*Assistant Examiner* — Philip L Cotey
(74) *Attorney, Agent, or Firm* — KandareIP, LLC; Anthony W. Kandare (57) ABSTRACT

An optical fiber grating sensing method applied to small-scale fire source monitoring are provided, distinguishing two concepts of a spatial resolution and a perception resolution, under the premise of ensuring the spatial resolution of a traditional fiber Bragg grating sensing system, only increase the number of fiber Bragg gratings covered by a single pulsed optical signal without changing a pulse width of a pulsed optical signal, so as to improve the perception resolution of the system without increasing the requirements for a hardware circuit, and truly shorten an interval between adjacent fiber Bragg gratings. Improving the perception resolution of the system, which not only ensures the spatial resolution of the system, but also realizes the monitoring of small-scale fire sources; by adopting a simple feature extrac- (Continued)

tion algorithm to obtain fire temperature information in different areas, the temperature detection speed of the system is fast.

2 Claims, 4 Drawing Sheets

(51) Int. Cl.
*G01K 3/14* (2006.01)
*G08B 29/04* (2006.01)

(56) References Cited

U.S. PATENT DOCUMENTS

| | | | | |
|---|---|---|---|---|
| 2004/0067003 | A1* | 4/2004 | Chliaguine | G01M 3/047 385/13 |
| 2005/0111793 | A1* | 5/2005 | Grattan | G01L 1/242 385/37 |
| 2015/0111793 | A1 | 4/2015 | Badrak et al. | |
| 2019/0383672 | A1* | 12/2019 | Liu | B64D 45/00 |

FOREIGN PATENT DOCUMENTS

| | | |
|---|---|---|
| GN | 106441385 A | 2/2017 |
| GN | 108303196 A | 7/2018 |

\* cited by examiner

OPTICAL FIBER GRATING SENSING METHOD APPLIED TO SMALL-SIZE FIRE SOURCE MONITORING

CROSS-REFERENCE TO RELATED APPLICATIONS

The application claims priority to Chinese patent application No. 202010387542.4, filed on May 9, 2020, the entire contents of which are incorporated herein by reference.

TECHNICAL FIELD

The disclosure relates to the technical field of small-size fire source monitoring, in particular to an optical fiber grating sensing method applied to small-size fire source monitoring.

BACKGROUND

Optical fiber sensor temperature measurement technology has the advantages of anti-electromagnetic interference, anti-corrosion, long detection distance and large reuse capacity, so that optical fiber sensor temperature measurement technology has replaced traditional electrical fire detection technology in many fields such as petroleum, petrochemical, electric power, and tunnel traffic, etc., and has become the mainstream fire detection technology. However, with the development of science and technology, people have a clear understanding of the initiation and development process of fire. Fire detection technology not only needs to be able to achieve long-distance, large-scale monitoring, but also needs to monitor the temperature rising along the fire detection line intensively. In the way, early warning is given when the fire source is small, and the fire is extinguished in the bud.

The technology based on Fiber Bragg Grating (FBG) temperature sensing is a mature technology in the fire detector market. The temperature of the FBG's center wavelength is sensitive to temperature to measure the temperature of the area where the FBG is located, and it has a signal-to-noise ratio. High, fast response speed and other advantages. However, FBG can only sense its own temperature changes, and the optical fiber between FBG and FBG does not have the sensing ability. Therefore, the technology is a quasi-distributed sensing technology. The detecting ability of small-sized fire sources mainly depends on adjacent the spacing between FBGs.

The traditional FBG temperature sensing system mainly has two networking methods. The first networking method is a networking method based on wavelength division multiplexing (WDM) technology. Multiple FBGs with strong reflectivity of different wavelengths are welded in series to form a sensor network. The interval between FBGs can be set arbitrarily according to different situation, so FBG can realize the perception of small size fire source, however, due to the influence of light source bandwidth and welding loss, the number of multiplexing of the system is only a few dozen at most, which makes it difficult to achieve large-scale long-distance detection. The second networking method is a networking method based on time division multiplexing (TDM) technology, where multiple FBGs with the same wavelength and weak reflectivity are welded in series to form a sensor network, since it is no longer limited by the bandwidth of the light source, the multiplexing capacity of the system can reach hundreds. However, the interval between FBGs (usually on the meter level) is limited by the pulse width of the pulsed light source and the bandwidth of the hardware circuit, which makes it difficult for the system to detect small-sized fire sources.

With the advent of online fiber grating writing technology, the FBG sensor network adopts industrial fiber drawing tower manufacturing technology to write sensor gratings continuously by multiple points during the fiber drawing process, which avoids welding loss and increases the mechanical strength of the sensor network. FBG sensor network can write tens of thousands of gratings on an optical fiber, enjoying high spatial resolution, large system capacity, long detection distance and high flexibility. Although the preparation of the sensor network has made a qualitative leap, in the sensor network using TDM technology networking mode, the demodulation system is always limited by the pulse width of the pulsed optical signal, and it is impossible to shorten the distance between adjacent FBGs. It is impossible to realize long-distance, large-capacity and high-density small-scale fire source monitoring.

Therefore, the technical problem to be solved by the disclosure is to provide an optical fiber grating sensing method applied to small-scale fire source monitoring, dividing the densely distributed FBG sensor network into several larger areas, and using pulsed light with a wider pulse width to obtain the overall spectral information of different areas, which not only ensures the spatial resolution of the system but also realizes the monitoring of small-scale fire sources. light.

SUMMARY

The technical problem to be solved by the disclosure is to provide an optical fiber grating sensing method applied to small-scale fire source monitoring, dividing the densely distributed FBG sensor network into several larger areas, and using pulsed light with a wider pulse width to obtain the overall spectral information of different areas, which not only ensures the spatial resolution of the system but also realizes the monitoring of small-scale fire sources.

An optical fiber grating sensing method applied to small-scale fire source monitoring, comprising the following steps:

S1, engraving n FBGs with equal intervals on a single optical fiber continuously to form an identical UWFBG (ultra-weak fiber Bragg grating) sensor network of large-capacity, an interval between adjacent FBGs is $\Delta L$, recording the effective detection length of the identical (UWFBG) sensor network as $L_{fiber}$, and then $L_{fiber}=n*\Delta L$;

S2, dividing the identical UWFBG sensor network into 2N regions of equal length, and m FBGs are distributed in each region, denoting a length of each area as D, and then $D=m*\Delta L=L_{fiber}/2N$, and a spatial resolution of the identical UWFBG sensor network is D, and the spatial resolution D is constant;

S3, inputting a pulsed optical signal into the identical UWFBG sensor network, a pulse width of a single pulsed optical signal covers all FBGs in an area, recording the pulse width of the pulsed optical signal as t, and recording a period as T; then $t=2n_{eff}D/c$, $T>2n_{eff}L_{fiber}/c$, including $n_{eff}$ is a refractive index of a fiber core, and c is a propagation speed of light in vacuum;

S4, inputting pulsed optical signal to the identical UWFBG sensor network, reflection spectrum signals of m FBGs in each area are superimposed to form an overall regional spectrum signal;

S5, summarizing and classifying the overall regional spectrum, establishing different data processing mechanisms according to the overall regional spectrum, and obtaining detailed temperature information, so as to monitor a small-scale fire source;

On the basis of the above technical solutions, preferably, the value range of ΔL in S1 is from 8 cm to 20 cm.

On the basis of the above technical solutions, preferably, the overall regional spectrum in S5 is respectively denoted as feature 1, feature 2, feature 3, and feature 4;

feature 1: when all FBGs in the area are under the same condition, a center wavelength of all FBGs in the area changes with the temperature, the spectra of all FBGs are superimposed into the overall regional spectrum, and the overall regional spectral shape is similar to that of a single FBG but a peak intensity is m times the peak intensity of the single FBG, further, the overall regional spectrum shows an overall movement;

feature 2: when an area of only the single FBG in the area changes, the single FBG is recorded as FBG #n, a spectrum of FBG #n gradually separates from the overall regional spectrum and moves toward a long wavelength direction, and further, a main peak intensity of the overall regional spectrum drops to (m−1)/m of an overall regional spectrum peak intensity under feature 1;

feature 3: when multiple FBGs in the area are affected by a same temperature and change, the overall regional spectrum shows that the main peak intensity drops to (m−x)/m of an overall regional spectral intensity under feature 1, and x is the number of affected FBG, an intensity of a side peak increases to x/m, and the intensity of the side peak moves with the temperature;

feature 4, when multiple FBGs in the area change under a influence of different temperatures, the overall regional spectrum shows that the main peak intensity drops to (m−x)/m of the overall regional spectrum intensity under feature 1, x is the number of affected FBGs, and a shape of the side peaks changes with the temperature of each FBG, a width of the spectrum of the overall region represents the size of the temperature gradient of the FBG in the region, and an intensity distribution of the side peaks is related to the number of FBGs on different temperature gradients;

Further, the data processing mechanism in S5 comprising following steps:

S101, a system initialization: maintaining all FBGs in the identical UWFBG sensor network at the same reference temperature C, then obtaining a maximum value of the overall regional spectrum of each area at the time and a corresponding wavelength as the reference value of the system, the maximum value of the overall regional spectrum is denoted as $M_i$, and the corresponding wavelength of $M_i$ is denoted as $\lambda_i$, where i represents a ith area, obtaining a sidelobe intensity on both sides of the regional spectrum, recording a left sidelobe intensity as $S_{Left}$, and a right sidelobe intensity as $S_{Right}$, recording a wavelength $\lambda_{Left\_i}$ corresponding to the intensity of a leftmost sg times $S_{Left}$ of the overall regional spectrum and a wavelength $\lambda_{Right\_i}$ corresponding to the intensity of a rightmost sg times $S_{Right}$ of the overall regional spectrum as a calibration value of the system. the value of sg is based on the system's calibration value;

S102, obtaining the maximum value MAX of the overall regional spectrum of area i and a wavelength λ corresponding to MAX when the system is running in real time, and comparing MAX with $M_i$;

if MAX and $M_i$ are equal, the overall regional spectrum of area i belongs to feature 1, and the highest temperature value of area i is recorded as $T_i$, $T_i=C+k*(\lambda-\lambda_i)$, and k is the temperature/wavelength coefficient of FBG;

if MAX and $M_i$ are not equal, proceeding to S103;

S103, determining whether the maximum MAX of the overall regional spectrum of the area i satisfies MAX≥(m−1)/m*$M_i$;

if MAX≥(m−1)/m*$M_i$, executing S104; if equator MAX≥(m−1)/m*$M_i$ is not satisfied, then traversing a spectrum data of the whole region, finding two peak points $MAX_L$ and $MAX_R$, and executing S105;

S104, comparing the wavelength λ corresponding to MAX with $\lambda_i$;

if λ and $\lambda_i$ are equal, then the overall regional spectrum of area i belonging to feature 2, and the highest temperature value of area i: $T_i=C+k*(\lambda_{Right}-\lambda_{Right\_i})$, $\lambda_{Right}$ is the wavelength at sg times $S_{Right}$ intensity on the far right side of the overall regional spectrum;

if λ and $\lambda_i$ are not equal, the overall regional spectrum of area i belonging to feature 4, and the highest temperature in area i is $T_i=C+k*(\lambda_{Right}-\lambda_{Right\_i})$, the temperature value of other FBG is $C+k*(\lambda-\lambda_i)$;

S105, determining whether the sum of the intensities of the two peak points $MAX_L$ and $MAX_R$ is equal to $M_i$;

if $MAX_L$ and $MAX_R$ is equal to $M_i$, the overall regional spectrum of area i belongs to feature 3, and FBGs in area i are divided into two groups, FBGs in each group are affected by the same temperature and the number of FBGs in each group is $m*MAX_L/(MAX_L+MAX_R)$ and $m*MAX_R/(MAX_L+MAX_R)$, obtaining the wavelength $\lambda_L$ and $\lambda_R$ corresponding to the two peak points $MAX_L$ and $MAX_R$, and the temperature information of the two groups of FBGs in area i are respectively: $TL=C+k*(\lambda_L-\lambda_i)$, $TR=C+k*(\lambda_R-\lambda_i)$;

if $MAX_L$ and $MAX_R$ is not equal to $M_i$, the overall regional spectrum of area i belonging to feature 4, the highest temperature of area i is $C+k*(\lambda_{Right}-\lambda_{Right\_i})$, and a lowest temperature is $C+k*(\lambda_{Left}-\lambda_{Left\_i})$, $\lambda_{Left}$ is the wavelength at sg times $S_{Right}$ intensity at the leftmost side of the spectrum.

The optical fiber grating sensing method applied to small-scale fire source monitoring has the following beneficial effects comparing to the prior art:

(1) The use of ultra-weak reflectivity FBG in the identical UWFBG sensor network can greatly increase the multiplexing capacity of the identical UWFBG sensor network. Therefore, the identical UWFBG sensor network of the present disclosure also has a small-scale fire source perception. It also has long-distance fire detection capabilities.

(2) Dividing the optical fiber into several sensing areas of equal length, and the number and parameters of FBG in each area are the same, which avoids complicated networking methods and reduces the difficulty of demodulation;

(3) distinguishing the two concepts of a spatial resolution and a perception resolution, and the spatial resolution of the identical UWFBG sensor network is D, and the spatial resolution D is constant. The pulse width of a single pulsed optical signal covers all FBGs in an area, and pulsed optical with a wider pulse width is used to obtain information of the overall spectrum of different areas. under the premise of ensuring the spatial resolution of a traditional FBG sensing system, only increase the number of FBGs covered by a single pulsed optical signal without changing a pulse width of a pulsed optical signal, so as to improve the perception resolution of the system without increasing the requirements for a hardware circuit, and truly shorten an interval between adjacent FBGs, improving the perception resolution of the system and then realizing the detection of small-scale fire sources;

(4) since the identical UWFBG in each region has the same optical parameters, the superimposed regional spectrum is still affected by the external temperature. Compared with traditional FBG sensing technology, the spectrum of the region contains more information (wavelength-Intensity-shape information), which is more conducive to the temperature detection of small-sized fire sources;

(5) by adopting a simple feature extraction algorithm to obtain fire temperature information in different areas, the temperature detection speed of the system is fast.

For different small-size fire source monitoring scenarios, the present disclosure can provide detailed and accurate temperature information based on a reference value and a calibration value, or simply provide simple abnormal temperature (high temperature) data based on the calibration value to increase the response speed. So as to realize the rapid warning of small-sized fire sources.

DETAILED DESCRIPTION OF THE EMBODIMENTS

In order to make the objects, technical solutions, and advantages of the present disclosure clear, the present disclosure will be further described in detail below with reference to the embodiments and drawings. The exemplary embodiments of the present disclosure and the description thereof are only used to explain the present disclosure, not as a limitation of the present disclosure. Based on the embodiments of the present disclosure, all other embodiments obtained by those of ordinary skill in the art without creative work shall fall within the protection scope of the present disclosure.

Embodiment 1

The traditional FBG temperature sensing system mainly has two networking methods: One is a networking method based on wavelength division multiplexing (WDM) technology, in which multiple FBGs with strong reflectivity of different wavelengths are welded in series to form a sensor network, the interval between FBGs can be arbitrarily set according to needs, so the perception of small-sized fire sources can be realized. However, due to the influence of light source bandwidth and welding loss, the number of multiplexing of the system is only a few dozen at most, which makes it difficult to achieve large-scale long-distance detection;

The other is a networking method based on time division multiplexing (TDM) technology, where multiple FBGs with the same wavelength and weak reflectivity are welded in series to form a sensor network. Since it is no longer limited by the bandwidth of the light source, the multiplexing of the system The capacity can reach hundreds. However, the interval between FBGs (usually on the meter level) is limited by the pulse width of the pulsed light source and the bandwidth of the hardware circuit, making it difficult for the system to detect small-sized fire sources. At the same time, due to the weak reflectivity of FBG (in order to avoid the crosstalk problem between FBGs), the welding loss introduced by too many welding points causes the signal-to-noise ratio of the FBG sensor at the end of the sensor network to be poor.

In order to overcome the problem of poor signal-to-noise ratio caused by the weak reflectivity of FBG in TDM technology, multiple FBGs with strong reflectivity of the same wavelength are welded in parallel on the splitter to form a sensor network. Each FBG corresponds to a different extension, which means in order to improve the reflectivity of FBG without introducing crosstalk and other problems, the serial network is changed to a parallel network. Changing the series network to the parallel network can realize the detection of small-scale fire sources, because the arrangement of multiple sensing fibers breaks through the limitation of space factors. However, the method for changing the series network to the parallel network does not improve the demodulation system. The length of the delay fiber corresponding to each FBG is also limited by the pulse width of the pulse optical source and the bandwidth of the hardware circuit. At the same time, the loss introduced by devices such as splitters also limits the multiplexing capacity of the system.

With the emergence of online fiber grating writing technology, the preparation of FBG sensor network no longer requires multiple FBGs for welding. Industrial fiber drawing tower preparation technology is adopted to write sensor gratings continuously at multiple points during the fiber drawing process, avoiding welding loss, at the same time, it also increases the mechanical strength of the sensor network, which can realize the writing of tens of thousands of gratings on an optical fiber, comprising high spatial resolution, large system capacity, long detection distance, and high flexibility. Although the preparation of the sensor network has made a qualitative leap, in the sensor network using the TDM technology networking mode, the demodulation system is always limited by the pulse width of the pulsed optical signal, and it is impossible to shorten the distance between adjacent FBGs in a true sense. The interval, that is, the spatial resolution (perceived resolution) of the system is determined by the pulse width of the pulsed optical signal. The shorter the pulse width, the higher the spatial resolution (perceived resolution) of the system, but the higher the bandwidth requirements of the hardware circuits in the system. It is worth mentioning that the spatial resolution comprising the minimum distance between two adjacent fire sources that can be identified along the fiber length distribution of the distributed grating sensor, and is determined by the pulse width of the pulsed optical signal; perceived resolution is the smallest size that comprising the fire source that the distributed grating sensor can identify along the length of the optical fiber. It can be seen that spatial resolution and perceptual resolution are two concepts. In the demodulation system based on FBG sensing, researchers always default the perception resolution of the system to the spatial resolution of the system. Therefore, the system has always been limited by the pulse width of the pulsed optical signal and cannot achieve long-distance, large-capacity, high-density Small size fire source monitoring.

In summary, the networking method based on wavelength division multiplexing (WDM) technology has only a few dozen multiplexes at most, making it difficult to achieve large-scale long-distance detection; in the networking method based on time division multiplexing (TDM) technology, there are two problems:

(1) the interval between FBGs (usually on the meter level) is limited by the pulse width of the pulsed optical source and the bandwidth of the hardware circuit, making it difficult for the system to detect small-sized fire sources;

(2) the perceived resolution of the system is defaulted to the spatial resolution of the system. Therefore, the system has always been limited by the pulse width of the pulsed optical signal and cannot achieve long-distance, large-capacity, high-density and small-scale fire source monitoring.

The embodiments of the disclosure based on time division multiplexing (TDM) technology, in order to solve two problems encountered in the networking method of time division multiplexing (TDM) technology. In the embodiments of the disclosure, a long-distance, high-density, and large-capacity identical ultra-weak fiber grating (UWFBG) sensor array made by ultra-large-capacity FBG online writing technology is used as a sensor network to provide an optical fiber grating sensing method applied to small-scale fire source monitoring, comprising the following:

S1, engraving n FBGs with equal intervals on the single optical fiber continuously to form the identical UWFBG sensor network of large-capacity, the interval between adjacent FBGs is ΔL, recording the effective detection length of the identical UWFBG sensor network as $L_{fiber}$, and then $L_{fiber}=n*\Delta L$;

in the embodiment, the interval ΔL is equivalent to the size of the fire source, further preferably, the value range of ΔL is from 8 cm to 20 cm.

The beneficial effect of the step is: the use of FBG with ultra-weak reflectivity in the identical UWFBG sensor network can greatly increase the multiplexing capacity of the identical UWFBG sensor network. Therefore, the identical UWFBG sensor network also has a small size. Along with source sensing capability, it also has long-distance fire detection capability.

Figure 1:
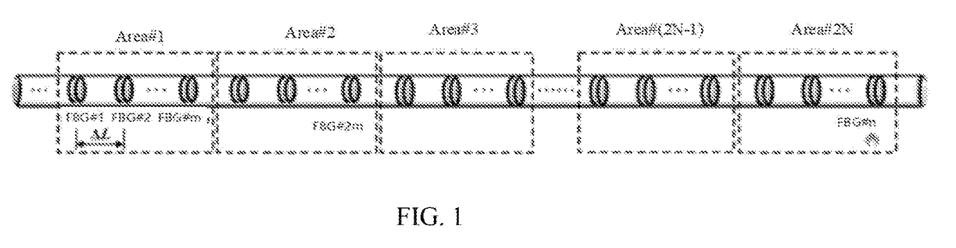
FIG. 1 is a schematic diagram of an identical UWFBG sensing network of large-capacity structure in an optical fiber grating sensing method applied to small-scale fire source monitoring in the present disclosure.

S2, dividing the identical UWFBG sensor network into 2N regions of equal length, and m FBGs are distributed in each region, denoting a length of each area as D, and then $D=m*\Delta L=L_{fiber}/2N$, and a spatial resolution of the identical UWFBG sensor network is D, and the spatial resolution D is constant;

As shown in FIG. 1, the 2N areas are respectively denoted as area #1, area #2, area #3 ... area #2N. Since temperature changes in different regions will not affect adjacent regions, the spatial resolution of the identical UWFBG sensor network is D, and the spatial resolution D has been determined when the length of the region is set. Therefore, the spatial resolution of the embodiment rate D will not change.

The beneficial effect of the step is that the optical fiber is divided into several sensing areas of equal length, and the number and parameters of FBG in each area are the same, which avoids complicated networking modes and reduces the difficulty of demodulation.

S3, inputting a pulsed optical signal into the identical UWFBG sensor network, the pulse width of a single pulsed optical signal covers all FBGs in an area, recording the pulse width of the pulsed optical signal as t, and recording the period as T; then $t=2n_{eff}D/c$, $T>2n_{eff}L_{fiber}/c$, including $n_{eff}$ is a refractive index of a fiber core, and c is a propagation speed of light in vacuum;

in the embodiment, the pulse width of a single pulsed optical signal covers all FBGs in an area, that is, the pulse width of a single pulsed optical signal covers m FBGs. The sensing resolution of the identical UWFBG sensor network is determined by the number of FBGs covered by a single pulsed optical signal. The greater the number of FBGs covered by a single pulsed optical signal, the higher the sensing resolution of the identical UWFBG sensor network.

In traditional sensing technology, the shorter the pulse width of the pulse signal, the higher the spatial resolution of the system, but the higher the bandwidth requirement of the hardware circuit in the system. However, the existing hardware circuit fails to meet the requirements and cannot be truly meaningful. Shorten the interval between adjacent FBGs, thereby improving the spatial resolution of the system and realizing the purpose of small-scale fire source monitoring. In the step, under the premise of ensuring the spatial resolution of the traditional FBG sensing system, only the number of FBGs covered by a single pulsed optical signal can be increased to improve the sensing resolution of the system, and the pulsed optical with a wider pulse width can be used to obtain different areas. The overall spectrum information, so as to realize the detection of small-sized fire sources, reduce the requirements on the hardware circuit, and truly shorten the interval between adjacent FBGs.

In the traditional FBG sensing system, the requirements of the pulse width t of the pulsed optical signal are: $t<2n_{eff}D/c$, as long as the pulse width t satisfies $t<2n_{eff}D/c$, the two FBGs before and after can be distinguished. In the embodiment, because the pulse width of the pulsed optical signal needs to cover all the gratings in each area, if the pulse width t is less than $2n_{eff}D/c$, it cannot cover all the gratings in the area; if the pulse width t is greater than $2n_{eff}D/c$, it is impossible to distinguish the front and rear partitions. Therefore, in the embodiment, $t=2n_{eff}D/c$.

The beneficial effect of the step is that the two concepts of spatial resolution and perceived resolution have been distinguished in the embodiment, distinguishing the two concepts of a spatial resolution and a perception resolution, under the premise of ensuring the spatial resolution of a traditional FBG sensing system, only increase the number of FBGs covered by a single pulsed optical signal without changing the pulse width of the pulsed optical signal, so as to improve the perception resolution of the system without increasing the requirements for a hardware circuit, and truly shorten an interval between adjacent FBGs. realizing the monitoring of small-scale fire sources.

S4, inputting pulsed optical signal to the identical UWFBG sensor network, reflection spectrum signals of m FBGs in each area are superimposed to form an overall regional spectrum signal;

The beneficial effect of the step is that since the identical UWFBG in each region has the same optical parameters, the superimposed regional spectrum is still affected by the external temperature. Compared with traditional FBG sensing technology, the spectrum of the region contains more information (wavelength-Intensity-shape information), which is more conducive to the temperature detection of small-sized fire sources.

S5, summarizing and classifying the overall regional spectrum, establishing different data processing mechanisms according to the overall regional spectrum, and obtaining detailed temperature information, so as to monitor a small-scale fire source;

The beneficial effect of the step is that compared with a distributed optical fiber temperature measurement system based on Raman scattering technology, the embodiment uses an identical ultra-weak reflectivity FBG sensor network of large-capacity to replace the single-mode optical fiber, and in the manufacturing process of the sensor network, too many complicated processing techniques are not introduced, and the detection of small-scale fire sources is realized by reducing the distance between the gratings. At the same time, in the temperature detection process, under the premise of ensuring the same spatial resolution, since the sensing information contained in the wavelength-intensity-shape of the spectral domain is more abundant than the information contained in a Raman scattering signal, it can further improve the small size of the fire source detection capability;

Comparing with the traditional FBG fire detection technology based on the TDM+WDM+SDM composite networking method, the embodiment only adopts a simple TDM networking method to compare the spatial resolution of the FBG demodulation system based on the OTDR technology distinguish from the two concepts of perceived resolution, using pulsed light with a wider pulse width to obtain the overall spectral information of different areas, and obtain the fire temperature information of different areas by using simple feature extraction algorithms, which not only ensures the spatial resolution of the system but also realizes the monitoring of small-scale fire sources. The complexity and construction difficulty of the system are reduced, and the robustness and reliability of the system are improved.

Embodiment 2

Figure 2:
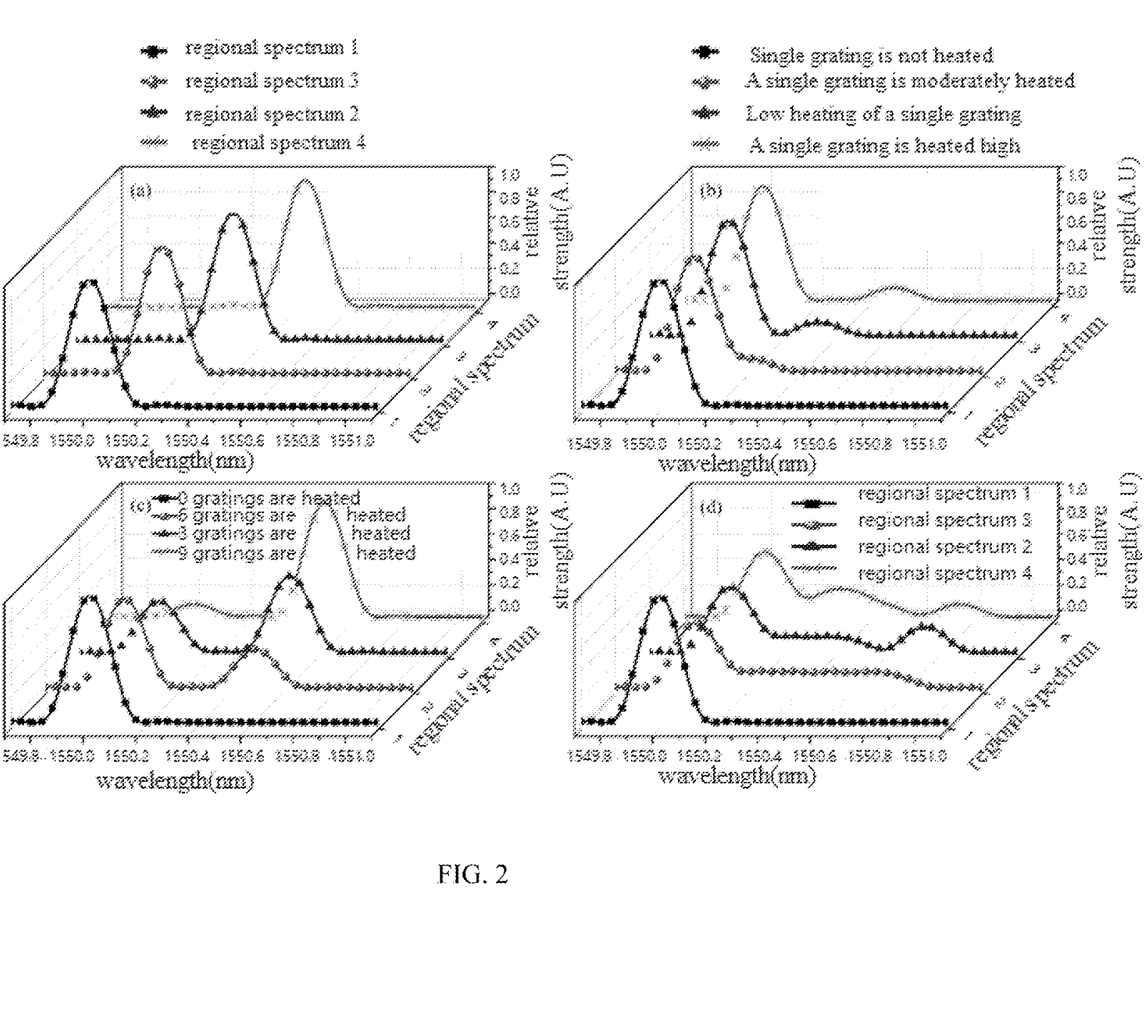
FIG. 2 is a schematic diagram of the characteristic changes of the regional spectrum in different situations in an optical fiber grating sensing method applied to small-scale fire source monitoring in the present disclosure.
Figure 3:
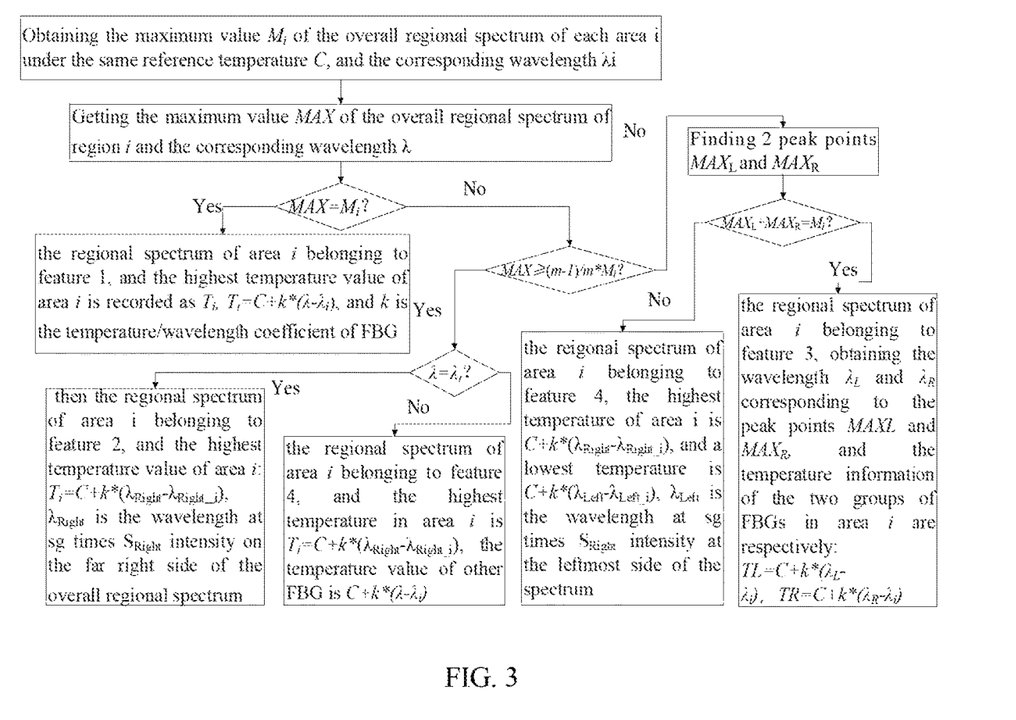
FIG. 3 is a schematic flow diagram of an optical fiber grating sensing method applied to small-scale fire source monitoring of the present disclosure.

On the basis of embodiment 1, the embodiment establishes different data processing mechanisms according to the overall regional spectrum. Before introducing the specific process of the data processing mechanism, first introduce the overall regional spectrum, the embodiment including four features, which are respectively denoted as feature 1, feature 2, feature 3, and feature 4, comprising the following details:

feature 1: when all FBGs in the area are under the same condition, the center wavelength of all FBGs in the area changes with the temperature, as shown in FIG. 2(a), the spectra of all FBGs are superimposed into the overall regional spectrum, and the overall regional spectral shape is similar to that of a single FBG but a peak intensity is m times the peak intensity of the single FBG, further, the overall regional spectrum shows the overall movement:

feature 2: when area of only the single FBG in the area changes, the single FBG is recorded as FBG #n, the shape of the regional spectrum of FBG #n will change, as shown in FIG. 2(B), the spectrum of FBG #n gradually separates from the overall regional spectrum and moves toward the long wavelength direction, and further, the main peak intensity of the overall regional spectrum drops to (m−1)/m of the overall regional spectrum peak intensity under feature 1;

feature 3: when multiple FBGs in the area are affected by a same temperature and change, that is, as the fire becomes larger, the number of affected FBGs gradually increases. At the time, the overall area spectrum will continue to decrease on the basis of feature 2, and the intensity of the side peaks will further increase, as shown in FIG. 2(C), the overall regional spectrum shows that the main peak intensity drops to (m−x)/m of the overall regional spectral intensity under feature 1, and x is the number of affected FBG, the intensity of a side peak increases to x/m, and the intensity of the side peak moves with the temperature.

feature 4, when multiple FBGs in the area change under a influence of different temperatures, that is, when the size of the fire source is small and the temperature gradient in the space affects multiple FBGs around the fire source, as shown in FIG. 2(d), the shifted spectrum is at a different center wavelength, but the center wavelength of the grating closest to the fire source deviates the farthest. The overall regional spectrum shows that the main peak intensity drops to (m−x)/m of the overall regional spectrum intensity under feature 1, x is the number of affected FBGs, and a shape of the side peaks changes with the temperature of each FBG, a width of the spectrum of the overall region represents the size of the temperature gradient of the FBG in the region, and an intensity distribution of the side peaks is related to the number of FBGs on different temperature gradients;

the data processing mechanism in S5 comprising the following:

S101, a system initialization: maintaining all FBGs in the identical UWFBG sensor network at the same reference temperature C, obtaining a maximum value of the overall regional spectrum of each area at the time and a corresponding wavelength as the reference value of the system, the maximum value of the overall regional spectrum is denoted as $M_i$, and the corresponding wavelength of $M_i$ is denoted as $\lambda_i$, where i represents a ith area, obtaining a sidelobe intensity on both sides of the regional spectrum, recording a left sidelobe intensity as $S_{Left}$, and a right sidelobe intensity as $S_{Right}$, recording a wavelength $\lambda_{Left\_i}$ corresponding to the intensity of a leftmost sg times $S_{Left}$ of the overall regional spectrum and a wavelength $\lambda_{Right\_i}$ corresponding to the intensity of a rightmost sg times $S_{Right}$ of the overall regional spectrum as a calibration value of the system. the value of sg is based on the system's calibration value;

S102, obtaining the maximum value MAX of the overall regional spectrum of area i and a wavelength λ corresponding to MAX when the system is running in real time, and comparing MAX with $M_i$;

if MAX and $M_i$ are equal, the overall regional spectrum of area i belonging to feature 1, and the highest temperature value of area i is recorded as $T_i$, $T_i=C+k^*(\lambda-\lambda_i)$, and k is the temperature/wavelength coefficient of FBG; in the embodiment, the highest temperature value of the area i is denoted as $T_i$ or can be expressed as $T_i=C+k^*(\lambda_{Right}-\lambda_{Right\_i})$, and $\lambda_{Right}$ is the wavelength value at the rightmost side of the spectrum at sg times the $S_{Right}$ intensity.

if MAX and $M_i$ are not equal, proceeding to S103;

S103, determining whether the maximum MAX of the overall regional spectrum of the area i satisfies MAX≥(m−1)/m*M;

if MAX≥(m−1)/m*$M_i$, executing S104; if equator MAX≥(m−1)/m*$M_i$ is not satisfied, then traversing a spectrum data of the whole region, finding two peak points $MAX_L$ and $MAX_R$, and executing S105;

comparing the wavelength λ corresponding to MAX with $\lambda_i$;

if λ and $\lambda_i$ are equal, then the overall regional spectrum of area i belonging to feature 2, and the highest temperature value of area i: $T_i=C+k^*(\lambda_{Right}-\lambda_{Right\_i})$, $\lambda_{Right}$ is the wavelength at sg times $S_{Right}$ intensity on the far right side of the overall regional spectrum;

if λ and $\lambda_i$ are not equal, the overall regional spectrum of area i belonging to feature 4, and the highest temperature in area i is Ti=$C+k^*(\lambda_{Right}-\lambda_{Right\_i})$, the temperature value of other FBG is $(C+k^*(\lambda-\lambda_r))$;

S105, determining whether the sum of the intensities of the two peak points $MAX_L$ and $MAX_R$ is equal to M;

if $MAX_L$ and $MAX_R$ is equal to $M_i$, the overall regional spectrum of area i belonging to feature 3, and FBGs in area i are divided into two groups, FBGs in each group are affected by the same temperature and the number of FBGs in each group is m*$MAX_L$/($MAX_L$+$MAX_R$) and m*$MAX_R$/($MAX_L$+$MAX_R$), obtaining the wavelength $\lambda_L$ and $\lambda_R$ corresponding to the peak points $MAX_L$ and $MAX_R$, and the temperature information of the two groups of FBGs in area i are respectively: $T_L=C+k^*(\lambda_L-\lambda_i)$, $TR=C+k^*(\lambda_R-\lambda_i)$;

if $MAX_L$ and $MAX_R$ is not equal to $M_i$, the overall regional spectrum of area i belonging to feature 4, the highest temperature of area i is $C+k*(\lambda_{Right}-\lambda_{Right\_i})$, and a lowest temperature is $C+k*(\lambda_{Left}-\lambda_{Left\_i})$, $\lambda_{Left}$ is the wavelength at sg times $S_{Right}$ intensity at the leftmost side of the spectrum.

The beneficial effects of the embodiment are:

the embodiment provides a simple feature extraction algorithm to obtain fire temperature information in different areas, which not only ensures the spatial resolution of the system but also realizes the monitoring of small-scale fire sources, at the same time, due to the simple demodulation algorithm, the temperature detection speed of the system is fast.

For different small-sized fire source monitoring scenarios, the embodiment can provide detailed temperature information, or only provide simple abnormal temperature (high temperature) data to increase the response speed, thereby realizing rapid warning of small-sized fire sources.

Embodiment 3

Figure 4:
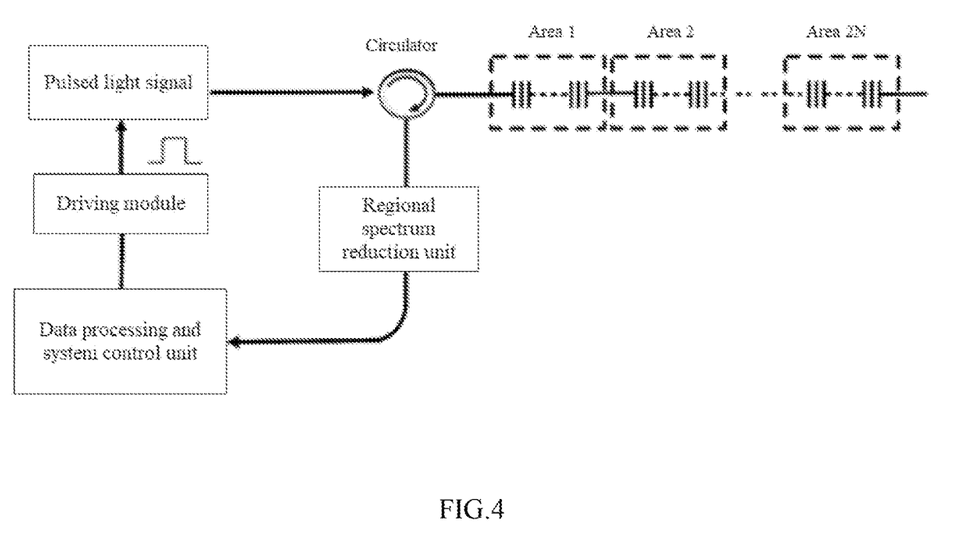
FIG. 4 is a block diagram of a demodulation system according to the 3th embodiment of the present disclosure.

According to the national standard GB16280-2014 "Linear Temperature Sensitive Fire Detector", any sensitive part of the detector with a length of 100 mm can quickly detect high temperature changes. It can be seen that how to improve the ability of optical fiber fire detection technology to monitor small-size (100 mm) fire sources is very important in fire prevention work. On the basis of embodiment 2, the embodiment combines a practical case to further explain the fiber grating sensing method of the application applied to small-scale fire source monitoring, comprising the following:

step. 1: writing 10,000 FBGs with a reflectivity of −47 dB and a center wavelength of 1550 nm on a single fiber continuously. As shown in FIG. 1, the interval between FBGs is 10 cm. Since each grating is sensitive to the external area, the sensor network can perceive a fire source with a minimum size of 10 cm. At the same time, the effective detection length of the sensor array is $L_{fiber}=n*\Delta L=1$ km;

step. 2: for ensuring the spatial resolution of the fire detection technology, the location of the fire source is usually accurate to within 1 m to be enough for firefighters to diagnose the heat source, so the spatial resolution is set to 1 m, that is, every 1 m long area of the FBG sensor network is regarded as a sensing area, which is divided into 1000 areas, namely area #1, area #2, area #3 . . . area #1000, and each area contains 10 FBGs;

step. 3: for distinguishing the signals of each area in the sensor network, according to the OTDR principle, the pulse width of the pulsed optical signal input to the sensor network is t=10 ns, and the period T is related to the total length of the fiber grating array, T≥10 us. In actual systems, 20 us is usually used to avoid the influence of multiple reflections in the fiber grating array;

step. 4: As shown in FIG. 4, the system control unit generating a pulsed optical signal with pulse width t=10 ns and period T=20 us through the control of the drive module. The spectrum range of the pulsed optical signal is 1548~1552 nm broadband light. When the pulsed light is input to the fiber grating After the array is in the array, the reflection spectrum signals of all FBGs in each area will overlap to form a new "area spectrum" signal as a whole, the new "area spectrum" signal arriving at the spectral restoration unit at different times, so different areas can be divided in time. Then the restored regional spectrum signal is sent to the data processing unit for final demodulation of sensor information;

step. 5: the regional spectrum contains information such as the wavelength, intensity and the cumulative shape of multiple gratings in the region. Here, the fire scenarios that may occur in the actual project and the regional spectrum under the corresponding scenarios are summarized and classified, comprising:

typical scenario 1: When there is no external temperature disturbance, the center wavelength of the 10 FBGs in a single area remains the same, and the spectral intensity also remains the same. When the pulsed light is input into the area, the reflection spectrum signals of all gratings are superimposed and formed at a wavelength of 1550 nm regional spectral signal whose intensity is 10 times that of a single grating, as shown regional spectrum 1 in FIG. 2(a), the spectrum is similar to the shape of a single grating spectrum. If there is a fire source that changes the center wavelengths of all FBGs at the same time, the regional spectrum will also change accordingly, as shown in the regional spectrum 2, regional spectrum 3 and regional spectrum 4 in FIG. 2(a), as the FBG center in the region as the wavelength shifts to the right, and the regional spectrum also shifts to the right;

typical scenario 2: when the area where only a single FBG is located in the area changes, as shown in FIG. 2(b), the center wavelength of a single grating increases from 1550 nm to 1550.2 nm, 1550.3 nm and 1550.5 nm after being heated, since the other 9 FBGs in the region where the grating is located are not affected, their reflection spectra remain basically unchanged. As the center wavelength of a single grating changes, the center wavelength of the fiber grating gradually separates from the regional spectrum, and as the temperature of the fire source increases, it moves to the long-wavelength direction. Since a single grating moves out of the regional spectrum, the main peak intensity of the regional spectrum will gradually change from 1 to 0.9 with the removal of one of the grating spectra, the center wavelength has been 1550 nm, and the separated spectrum (side peak) will change from 0.1 The intensity gradually moves to the long wavelength direction;

typical scenario 3: when multiple fiber gratings in the area are affected by the same temperature and change, that is, as the fire source's influence range increases, multiple fiber gratings are affected, as shown in FIG. 2(c), as the number of heated fiber gratings increases from 0, 3, 6 to 9, the intensity of the original regional spectrum will gradually decrease from 1, to 0.7, 0.4 to 0.1; and The intensity of the removed spectrum gradually increases from 0 to 0.3, 0.6 to 0.9;

typical scenario 4: When multiple FBGs in the area are affected by different temperatures and change, that is, the size of the fire source is small, and the temperature gradient in the space affects multiple FBGs around the fire source, the degree of wavelength shift of each FBG is different, and they are at different central wavelengths. Location and regional spectra show different intensity-wavelength graph. If half (5) of the FBGs are affected by different temperatures and drift to 1550.15 nm, 1550.30 nm, 1550.45 nm, 1550.60 nm, 1550.75 nm, the main peak intensity of the regional spectrum will decrease from 1 to 0.5, as shown in the area spectrum 2 in FIG. 2(d), the shifted spectrum is at a different center wavelength position, so the width of the side peak generated will be very wide, representing the range of temperature gradient influence from 1550 nm to 1550.75 nm, the wavelength of the FBG at the position of the highest temperature (at the small fire source) is most affected, drifting to 1550.75 nm; If half (5) of the FBGs are affected by different temperatures and drift to 1550.15 nm, 1550.30 nm, 1550.45 nm, 1550.75 nm, 1550.75 nm, the main peak intensity of the regional spectrum will decrease from 1 to 0.5, as shown in the area spectrum 3 in FIG. 2(d), the shifted spectrum is at a different center wavelength position, so the width of the side peak generated will be very wide, representing the range of temperature gradient influence from 1550 nm to 1550.75 nm, At the same time, the intensity at 1550.75 nm is 0.2, indicating that two FBGs are affected at the same time at the fire source and the center wavelength has drifted to 1550.75 nm; in the same way, the regional spectrum 4 represents that the FBG wavelength at the location of the highest temperature (at the small-scale fire source) is most affected, drifting to 1550.75 nm, and two FBGs are affected by the same temperature and drifting to 1550.3 nm.

According to the different regional spectrums under different scenarios, different data processing mechanisms are established to obtain detailed temperature information, so as to realize the monitoring of small-scale fire sources, wherein the following:

system initialization: keeping all FBGs in the sensor network at the same temperature of 20° C., as shown in regional spectrum 1 in FIG. 2(a), where the intensity value is expressed by relative intensity, since the number of gratings in a single area is 10, a single FBG gradually drifts out of the spectrum below 1/10 intensity. Taking the maximum coordinate of the regional spectrum 1 as (1550.0 nm, 1), that is, when the wavelength value is 1550.0 nm, the maximum intensity of the spectrum is 1, as the reference value of the system. Obtaining the sidelobe intensity $S_{Left}$=0.012 and $S_{Right}$=0.011 on both sides of the spectrum, and the sg is 1.1. At the same time, record the wavelength value of 154.982 nm at the leftmost intensity of 0.0132 and the wavelength value of 1550.18 nm at the rightmost intensity of 0.0121 as calibration values;

real-time operation of the system: obtaining the regional spectrum signals of each area in real time and performs temperature detection. Take the regional spectrum 2 and the regional spectrum 4 in FIG. 2(a) as examples. The coordinates of the maximum value of the two spectra are (1550.15 nm, 1) And (1550.45 nm, 1), comparing with regional spectrum 1, it has the same maximum value. Therefore, it is judged that these two spectra are typical scenario 1. Furthermore, the temperature values of regional spectrum 2 and regional spectrum 4 are 35° C. and 65° C., and the temperature coefficient is 1° C./10 pm. At the same time, take the rightmost wavelength values of 1550.33 nm and 1550.63 nm at 0.9/10 intensity in regional spectrum 2 and regional spectrum 4, and the temperature values calculated by using the reference value are also 35° C. and 65° C.

When the heating temperature of a single FBG in the region is low and the heating temperature is high, as shown in FIG. 2(b), the center wavelength of a single grating increases from 1550 nm to 1550.2 nm and 1550.5 nm after heating. First, the maximum values of the two regional spectra are (1550.00 nm, 0.901) and (1550.00 nm, 0.9), relative to the reference value of the system, the intensity has dropped by less than 1/10, so it is judged that the spectra of these two regions are both typical scenario 2. Take the wavelength values at the 0.0121 intensity on the far right of the two spectra as 1550.35 nm and 1550.64 nm, respectively. According to the calibration value of 1550.18 nm in the initialization record, the temperature values calculated from the two regional spectra are 37° C. and 66° C. respectively, and The temperature value calculated according to the actual wavelength change should be 40° C. and 70° C., with errors of 3° C. and 4° C. respectively. Although in the situation where only a single FBG is heated, the temperature value obtained by the present disclosure has an error with the true value, but compared with the optical fiber distributed Raman temperature sensing system, the present disclosure has a great improvement in performance. For the Raman temperature sensing system, if there is a small fire source of 40° C. and 70° C. with a size of 10 cm in the 1 m space, the measurement value of the Raman temperature sensing system is the average temperature within 1 m. Therefore, the temperature values obtained are 22° C. and 25° C. respectively, and the errors are 18° C. and 45° C. respectively. Causing the system to fail to respond to the fire source. Although the results obtained by the present disclosure have errors, the error is only less than 5° C. The error can respond normally to small-sized fire sources.

When multiple fiber gratings in the area are affected by the same temperature and change, as shown in FIG. 2(c), three FBGs are heated at the same time. Through the data traversal, it can be obtained that the spectrum of the region has two peaks, respectively (1550.0 nm, 0.7) and (1550.5 nm, 0.3) and satisfy the relationship of 0.7+0.3=1. Therefore, it can be judged that the spectrum of the region belongs to the typical scenario 3. According to the reference value of the system (1550.0 nm, 1), it can be concluded that there are 10*0.7/(0.7+0.3)=7 FBGs heated by 20° C.+1° C./10 pm* (1550 nm–1550 nm)=20° C., 10*0.3/(0.7+0.3)=3 FBGs heated at 20° C.+1° C./10 pm*(1550.5 nm–1550 nm)=70° C. Take the wavelength value of 1550.66 nm at the 0.0121 intensity on the far right side of the spectrum in the region, and the temperature value calculated according to the calibration value of 1550.18 nm in the initialization record is 68° C. with an error of 2° C. In the same way, when 9 FBGs are heated, according to the reference value, it can be concluded that there is 1 FBG heated at 20° C. and 9 FBGs heated at 70° C. in the area. The temperature value calculated according to the calibration value is 70° C., and the error is 0.

The spectral data of the area that does not meet the above conditions is judged as typical scenario 4, that is, multiple FBGs are affected by different temperatures, as shown in FIG. 2(d). Take regional spectrum 2 and regional spectrum 3 as examples. When the system obtains regional spectrum 2, only one peak (1550.0 nm, 0.511) is obtained by searching for the peak. 0.511 is not equal to the reference value 1 reserved by the system and is less than 0.9, so it can It is judged that there are multiple FBGs in the spectrum of the region that are affected by temperature, and because the spectrum of the region has only one peak point, the spectrum of the region will be judged as typical scenario 4. From the peak point, it can be concluded that there are 5 FBGs in the system at a temperature of 20° C., and the other FBGs are affected by different temperatures, and through the wavelength value of 1550.89 nm and the calibration value of 1550.18 nm at the 0.0121 intensity on the far right of the spectrum in the region, it can be concluded that the highest temperature FBG in the region is 910° C., with an error of 4° C. According to the wavelength value of 1549.83 nm and the calibration value of 1549.82 nm at the leftmost 0.0132 intensity in the spectrum of the region, it can be concluded that the FBG with the lowest temperature in the region is 21° C., with an error of 1° C.; when the system obtains regional spectrum 3, two peaks (1550.0 nm, 0.511) and (1550.75 nm, 0.201) can be obtained by peak searching. Since 0.511<0.9 and 0.511+0.201<1, the regional spectrum is judged to be a typical scenario 4, in the same way, according to the reference value, it can be seen that there are 5 FBGs in the area at a temperature of 20° C. and 2 FBGs in the area at a temperature of 95° C. According to the calibration value, the maximum value in the area is 93° C. with an error of 2° C.

The beneficial effect of the embodiment is that for different small-sized fire source monitoring scenarios, the embodiment can provide detailed and accurate temperature information according to the reference value and the calibration value, and it is also possible to provide simple abnormal temperature (high temperature) data only based on the calibration value to increase the response speed, so as to realize the rapid warning of small-scale fire sources. Although there is an error in the method of using the calibration value, it is far closer to the true value than the result obtained by the distributed optical fiber Raman temperature sensing system.

The objects, technical solutions, and advantages of the present disclosure have been described in further detail with reference to the above-described preferred embodiments, and it is to be understood that the above description is only illustrative of the preferred embodiments of the disclosure and is not intended to limit the scope of the disclosure. Any modification, equivalent replacement, improvement, etc., made within the spirit and principle of the present disclosure shall be included in the protection scope of the present disclosure.

What is claimed is:

1. An optical fiber grating sensing method applied to small-scale fire source monitoring, comprising following steps:
   S1, engraving n fiber Bragg gratings with equal intervals on a single optical fiber continuously to form an identical ultra-weak fiber Bragg grating sensor network of large-capacity, an interval between adjacent fiber Bragg gratings is $\Delta L$, recording the effective detection length of the identical ultra-weak fiber Bragg grating sensor network as $L_{fiber}$, and then $L_{fiber}=n*\Delta L$;
   S2, dividing the identical ultra-weak fiber Bragg grating sensor network into 2N regions of equal length, and m fiber Bragg gratings are distributed in each area, denoting a length of each area as D, and then $D=m*\Delta L=L_{fiber}/2N$, and a spatial resolution of the identical ultra-weak fiber Bragg grating sensor network is D, and the spatial resolution D is constant;
   S3, inputting a pulsed optical signal into the identical ultra-weak fiber Bragg grating sensor network, a pulse width of a single pulsed optical signal covers all fiber Bragg grating an area, recording the pulse width of the pulsed optical signal as t, and recording a period as T; then $t=2n_{eff}D/c$, $T>2n_{eff}L_{fiber}/c$, including $n_{eff}$ is a refractive index of a fiber core, and c is a propagation speed of light in vacuum;
   S4, inputting pulsed optical signal to the identical ultra-weak fiber Bragg grating sensor network, reflection spectrum signals of m fiber Bragg gratings in each area are superimposed to form an overall regional spectrum signal;
   S5, summarizing and classifying the overall regional spectrum, establishing different data processing mechanisms according to the overall regional spectrum, and obtaining detailed temperature information, so as to monitor a small-scale fire source;
   wherein, the overall regional spectrum in S5 including four features, which are respectively denoted as feature 1, feature 2, feature 3, and feature 4;
   feature 1: when all fiber Bragg gratings in the area are under a same condition, a center wavelength of all fiber Bragg gratings in the area changes with the temperature, a spectrum of all fiber Bragg gratings are superimposed into the overall regional spectrum, and the overall regional spectral shape is similar to that of a single fiber Bragg grating while a peak intensity is m times the peak intensity of the single fiber Bragg grating, further, the overall regional spectrum shows an overall movement;
   feature 2: when an area of only the single fiber Bragg grating in the area changes, the single fiber Bragg grating is recorded as FBG #n, a spectrum of FBG #n gradually separates from the overall regional spectrum and moves toward a long wavelength direction, and, further, a main peak intensity of the overall regional spectrum drops to (m−1)/m of an overall regional spectrum peak intensity under feature 1;
   feature 3, when multiple fiber Bragg gratings in the area are affected by a same temperature and change, the overall regional spectrum shows that the main peak intensity drops to (m−x)/m of an overall regional spectral intensity under feature 1, and x is a number of affected fiber Bragg grating, an intensity of a side peak increases to x/m, and the intensity of the side peak moves with temperature;
   feature 4, when multiple fiber Bragg gratings in the area change under a influence of different temperatures, the overall regional spectrum shows that the main peak intensity drops to (m−x)/m of the overall regional spectrum intensity under feature 1, x is the number of affected fiber Bragg gratings, and a shape of side peaks changes with the temperature of each fiber Bragg grating, a width of the spectrum of the overall region represents the size of a temperature gradient of the fiber Bragg grating in the area, and an intensity distribution of the side peaks is related to the number of fiber Bragg gratings on different temperature gradients;
   the data processing mechanism in S5 comprising following steps:
   S101, a system initialization: maintaining all fiber Bragg gratings in the identical ultra-weak fiber Bragg grating sensor network at a same reference temperature C, then obtaining a maximum value of the overall regional spectrum of each area and a corresponding wavelength as reference value of the system, the maximum value of the overall regional spectrum is denoted as $M_i$, and the corresponding wavelength of $M_i$ is denoted as $\lambda_i$, where i represents a ith area, obtaining a sidelobe intensity on both sides of the regional spectrum, recording a left sidelobe intensity as $S_{Left}$, and a right sidelobe intensity as $S_{Right}$, recording a wavelength $\lambda_{Left\_i}$ corresponding to an intensity of a leftmost sg times $S_{Left}$ of the overall regional spectrum and a wavelength $\lambda_{Right\_i}$ corresponding to the intensity of a rightmost sg times $S_{Right}$ of the overall regional spectrum as a calibration value of the system the value of sg is based on the system's calibration value;
   S102, obtaining the maximum value MAX of the overall regional spectrum of area i and a wavelength λ corresponding to MAX when the system is running in real time, and comparing MAX with $M_i$; region
   if MAX and $M_i$ are equal, the overall regional spectrum of area i belonging to feature 1, and a highest temperature value of area i is recorded as $T_i$, $Ti=C+k*(\lambda-\lambda_i)$, and k is a temperature/wavelength coefficient of fiber Bragg grating;

if MAX and $M_i$ are not equal, proceeding to S103;

S103, determining whether the maximum MAX of the overall regional spectrum of the area i satisfies MAX≥(m−1)/m*$M_i$;

if MAX≥(m−1)/m*$M_i$, executing S104; if equator MAX≥(m−1)/m*$M_i$ is not satisfied, then traversing a spectrum data of the whole area, finding two peak points $MAX_L$ and $MAX_R$, and executing S105;

S104, comparing the wavelength λ corresponding to MAX with $λ_i$;

if λ and $λ_i$ are equal, then the overall regional spectrum of area i belonging to feature 2, and the highest temperature value of area i: $T_i=C+k*(λ_{Right}−λ_{Right\_i})$, $λ_{Right}$ is the wavelength at sg times $S_{Right}$ intensity on a far right side of the overall regional spectrum;

if λ and $λ_i$ are not equal, the overall regional spectrum of area i belonging to feature 4, and the highest temperature in area i is $T_i=C+k*(λ_{Right}−λ_{Right\_i})$, the temperature value of other fiber Bragg grating is $C+k*(λ−λ_i)$;

S105, determining whether a sum of intensities of the two peak points $MAX_L$ and $MAX_R$ is equal to $M_i$;

if $MAX_L$ and $MAX_R$ is equal to $M_i$, the overall regional spectrum of area i belongs to feature 3, and fiber Bragg gratings in area i are divided into two groups, fiber Bragg gratings in each group are affected by the same temperature and the number of fiber Bragg gratings in each group is $m*MAX_L/(MAX_L+MAX_R)$ and $m*MAX_R/(MAX_L+MAX_R)$, obtaining the wavelength $λ_L$ and $λ_R$ corresponding to the two peak points $MAX_L$ and $MAX_R$, and the temperature information of the two groups of fiber Bragg gratings in area i are respectively: $T_L=C+k*(λ_L−λ_i)$, $T_R=C+k*(λ_R−λ_i)$;

if $MAX_L$ and $MAX_R$ is not equal to $M_i$, the overall regional spectrum of area i belonging to feature 4, the highest temperature of area i is $C+k*(λ_{Right}−λ_{Right\_i})$, and a lowest temperature is $C+k*(λ_{Left}−λ_{Left\_i})$, $λ_{Left}$ is the wavelength at sg times $S_{Right}$ intensity at the leftmost side of the spectrum.

2. The optical fiber grating sensing method applied to small-scale fire source monitoring according to claim 1, wherein a value range of ΔL in the S1 is from 8 cm to 20 cm.

* * * * *